Nov. 26, 1946.    W. H. CAPEN    2,411,520
RADIO LOCATING SYSTEM
Filed Dec. 22, 1939    3 Sheets-Sheet 1
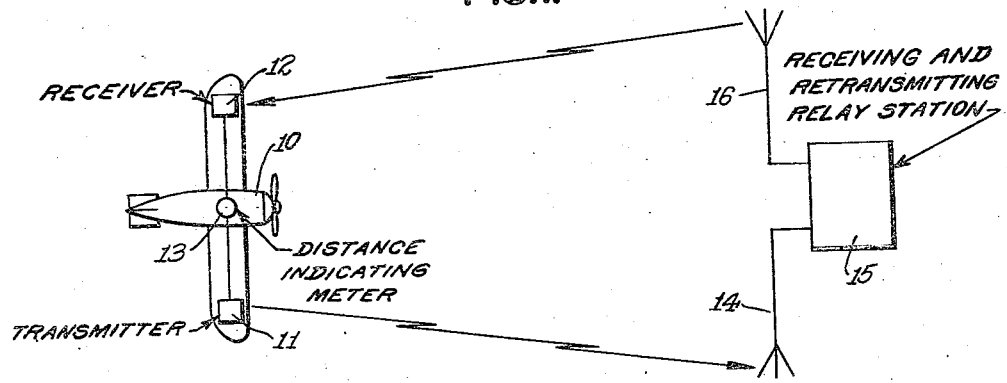
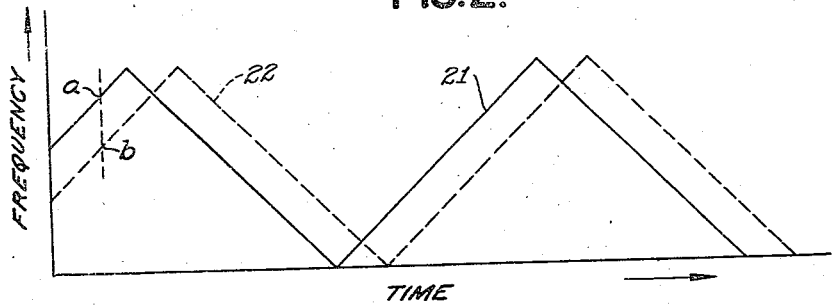
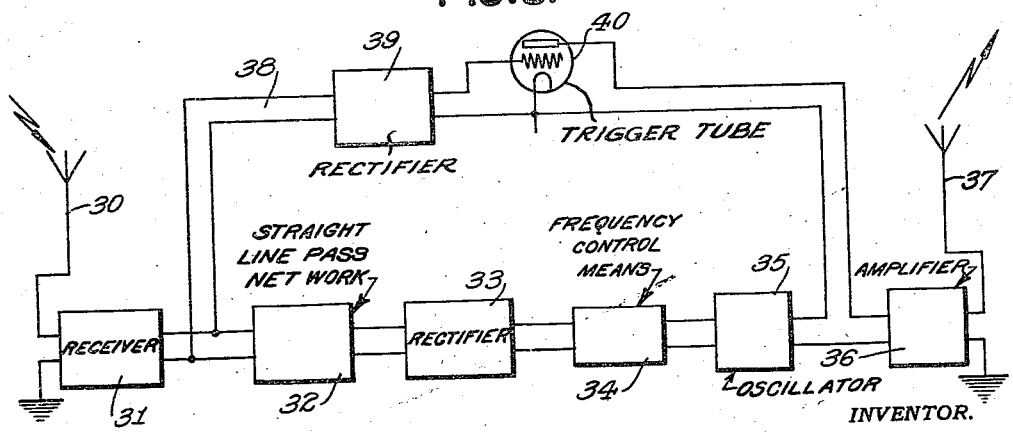
INVENTOR.
WILLIAM H. CAPEN
BY
ATTORNEY.

Nov. 26, 1946.   W. H. CAPEN   2,411,520
RADIO LOCATING SYSTEM
Filed Dec. 22, 1939   3 Sheets-Sheet 2
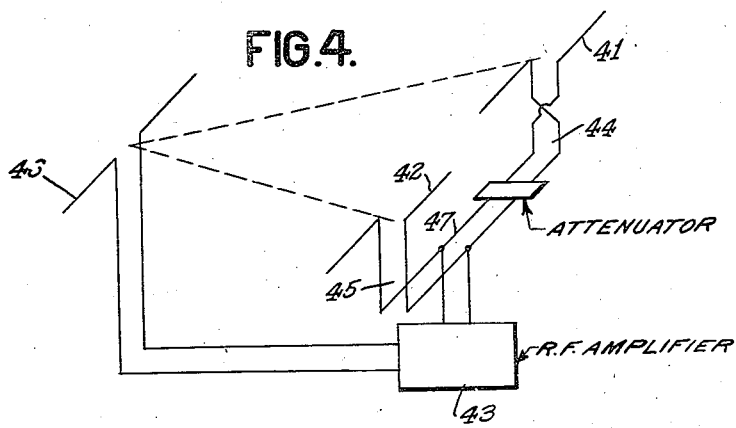
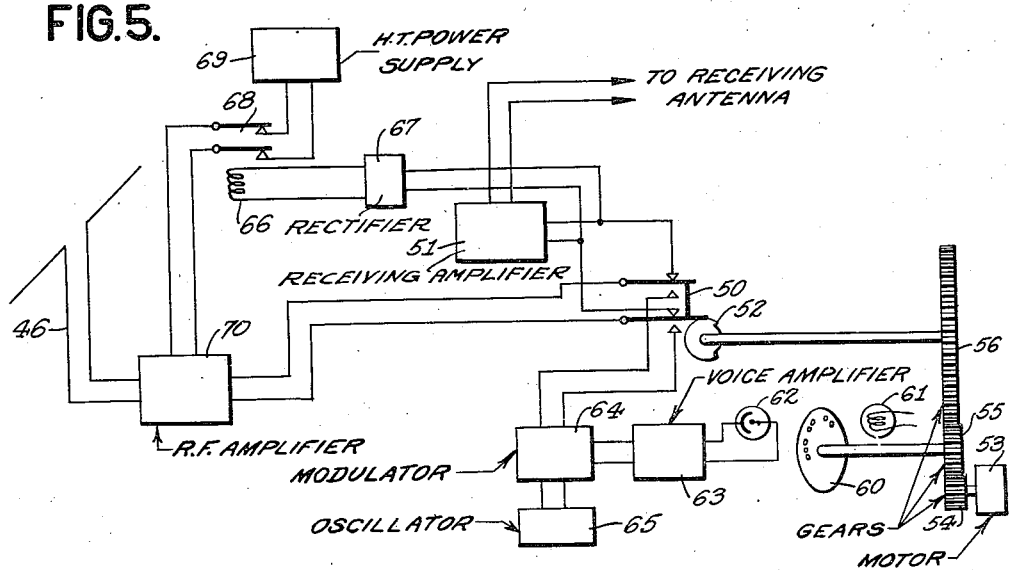
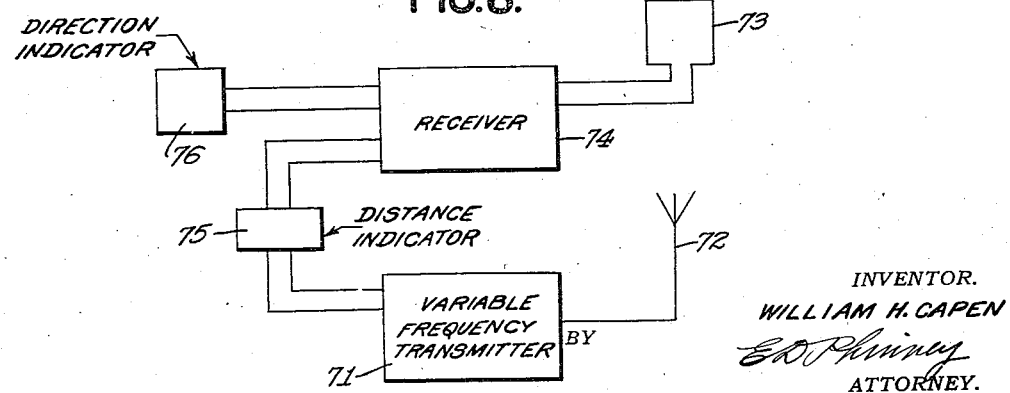
INVENTOR.
WILLIAM H. CAPEN
ATTORNEY.

Nov. 26, 1946.    W. H. CAPEN    2,411,520
RADIO LOCATING SYSTEM
Filed Dec. 22, 1939    3 Sheets-Sheet 3
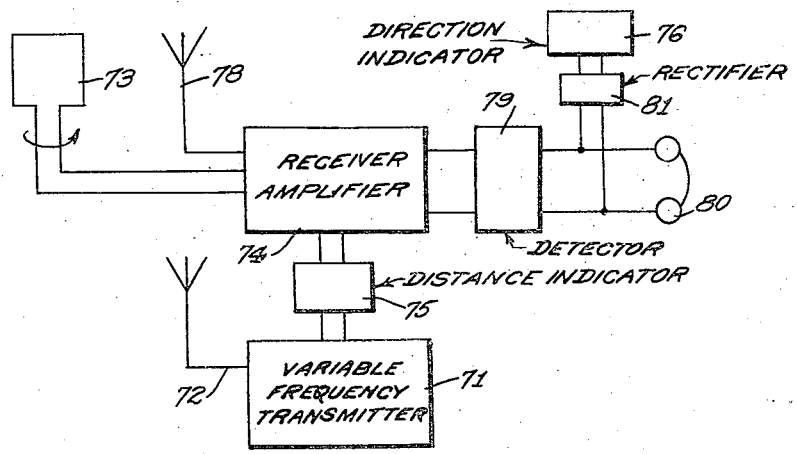
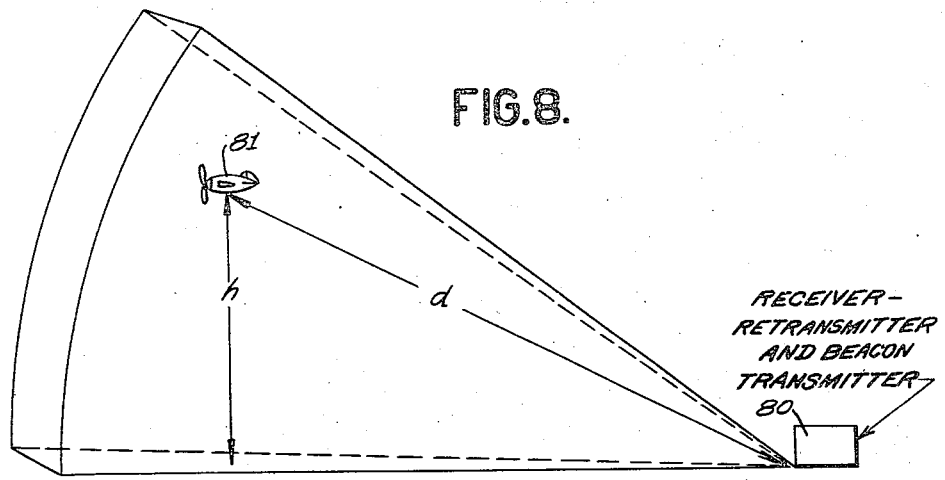
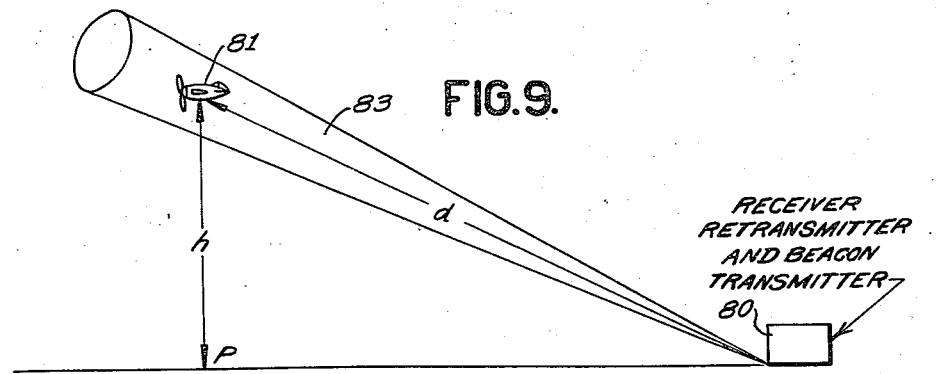
INVENTOR.
WILLIAM H. CAPEN
BY
ATTORNEY.

Patented Nov. 26, 1946

2,411,520

UNITED STATES PATENT OFFICE 2,411,520

RADIO LOCATING SYSTEM

William H. Capen, Mountain Lakes, N. J., assignor to International Standard Electric Corporation, New York, N. Y., a corporation of Delaware Application December 22, 1939, Serial No. 310,516

9 Claims. (Cl. 250—1)

My invention relates to distance and position determining systems and more particularly to systems and methods for determining the distance and position of a moving object by means of radio waves.

Known radio distance determining systems generally depend upon measurements of the angle at two separate transmitting points, or upon arrangements for giving an approximate indication of distance by means of signal strength measurement.

In a certain type of distance indicator, particularly used for altimeter purposes, a continuously varied frequency wave is transmitted to a reflecting object and the distance to the reflecting object is determined by means of a comparison of the frequency of the reflected wave with that of the wave being transmitted towards the reflecting surface.

This type of altimeter has been found to be quite satisfactory as it does not depend upon measurement of amplitude of waves nor the comparison of relative amplitudes thereof, but only upon a measurement of the frequency difference which depends upon the length of the transmitting path.

In accordance with my invention I provide a distance determining system utilizing a frequency varied transmitted wave and provide at the point from which the distance is to be determined, a transmitter arrangement responsive to receipt of the frequency varied waves for transmitting another frequency varied wave which may be compared at the receiver with a reference wave for indicating the distance.

It is a principal object of my invention to provide a radio distance determining means which is simple in construction and positive in operation.

It is a still further object of my invention to provide in a radio distance determining system means for simultaneously observing the direction of the distance point, so that the position of the receiving station may be determined.

It is a still further object of my invention to provide an arrangement wherein frequency modulated waves are transmitted from a first point to a second point and are received at the second point and retransmitted to the first point, whereby the distance between the two points may be determined.

It is a still further object of my invention to provide control means at a fixed repeater station responsive to variable frequency waves transmitted from a moving station for rendering a transmitter at the fixed station operative.

It is a still further object of my invention to provide a further signalling arrangement for indicating the identity of the repeating receiving retransmitting station.

It is a still further object of my invention to provide a lateral guiding beacon which in conjunction with said retransmitting station will provide an indication on the craft of the location with respect to a particular point of the earth's surface.

Other advantages and objects of my invention will be apparent from the particular description of a few embodiments thereof, made in connection with the accompanying drawings in which Fig. 1 is a diagram illustrating the arrangement in accordance with my invention;

Fig. 2 is a curve used for illustrating the operation of the receiving station on the moving objects;

Fig. 3 is a diagram of a retransmitting station operating in accordance with my invention;

Fig. 4 is a diagram illustrating an arrangement for preventing feedback and consequent singing of the amplifier at the receiving station;

Fig. 5 is a modified retransmitting station in accordance with my invention, including an arrangement for transmitting station identifying signals;

Fig. 6 is one form of system for use on an airplane in the combination of my invention;

Fig. 7 is a further modified form of distance determining receiver arrangement in accordance with my invention, and Figs. 8 and 9 illustrate an embodiment of my invention wherein beacon guiding is used in conjunction with a distance determining system.

In accordance with my invention I provide, as shown in Fig. 1, on a moving craft such as airplane 10, an arrangement comprising a transmitter 11, a receiver 12, and an indicating meter 13. Transmitter 11 emits a wave which is continuously cyclically varied between two fixed values. The transmitter is generally operated only at intervals when distance indication is desired and in the case of regular air lines may be used only after permission is given. This transmitted wave is received at a fixed point on a receiving antenna 14. Receiving antenna 14 is coupled to a receiving and retransmitting device 15, the output of which is coupled to a transmitting antenna 16, so that a wave varying in frequency in a manner similar to the received wave will be transmitted therefrom.

The wave transmitted from antenna 16 is received on craft 10 by receiver 12. This received wave is then conveyed to indicator 13 and simultaneously a small part of the energy being generated in the transmitter 11 is also conveyed to indicator 13. Indicator 13 is a frequency meter which indicates the frequency difference between the wave received at 12 and the wave being transmitted from 11. Since the frequency transmitted is continuously varying, the frequency difference is a function of time required for the wave to travel to its respective station and back, plus the time delay of apparatus 14, 15, 16, it is clear that the frequency difference between these waves will indicate the length of the path. The meter 13 may be calibrated directly in distance to provide on the craft a direct indication of its position relative to the receiving and transmitting station.

The function of the indicator may be more clearly understood by reference to Fig. 2. In this figure the solid line curve 21 represents the frequency of the wave transmitted from transmitter 11 with respect to time, and the broken line 22 represents the variation in frequency with respect to time of the wave received at receiver 12. Consequently the distance may be readily obtained from the frequency difference $a$, $b$, shown on the curve, allowing for the constant frequency difference due to the fixed time delay by the repeating station. The calibration of the meter can be so made that this is taken care of.

As a typical example of the frequencies involved, assume a normal carrier of 100 mc. and use a frequency variation of 2 mc., i. e., the carrier varies from minimum of 98 mc. to a maximum 102 mc. Assume this variation occurs with a period of $\frac{1}{5}$ of second for a complete cycle, i. e., the carrier varies from 98–102 mc. in $\frac{1}{5}$ second. Then as radio waves travel 186,000 miles per second a round trip to the ground station and return will be $^{2}/_{186000}$ second per mile away from station. Assume 10 miles distance, then time of travel will be $^{20}/_{186000}$ second and carrier difference as received at moving object will be $$(^{20}/_{186000}) \times 4 \times 10^6 \times 5$$

as carrier varies 4 mc. in $\frac{1}{5}$ of a second. This gives 2,150 cycles. For 100 miles the carrier frequency difference will be 21,500 cycles.

On account of the very high speed of such moving objects as airplanes the so-called Doppler effect on the frequency of the carrier as received at the moving object is not negligible. For a plane moving 200 miles per hour directly towards or away from the ground station the Doppler effect will change the received frequency by $33\frac{1}{3}$ cycles per second if the carrier is 100 mc. This is only approximately $1\frac{1}{2}\%$ error at a distance of 10 miles and for the conditions used in the example given immediately above and consequently does not introduce too great an error.

A suitable arrangement for the frequency variable retransmitter or repeater arrangement is shown in Fig. 3. In this arrangement the receiving antenna is indicated at 30 coupled to an automatic volume controlled receiving amplifier 31. The output of amplifier 31 is coupled to a network 32 so designed that with constant voltage output the voltage impressed on rectifier 33 is proportional to the received frequency. As is apparent to those skilled in the art, such a network may be readily designed for a predetermined frequency band, as is common in high fidelity receiver circuits. This frequency control means 34 is coupled to an oscillator 35 to vary the frequency of this oscillator in a manner similar to the frequency of the received wave signal. The output of oscillator 35 is then amplified in an amplifier 36 and is transmitted from antenna 37. A portion of the received signal is transmitted over line 38, to rectifier 39 and used to control a trigger tube arrangement 40.

Accordingly, when signals are received on antenna 30, they are rectified at 39 operating tube 40, which is in series between the oscillator output and the amplifier arrangement. Thus the transmitter 36 is rendered effective upon receipt of signals. The frequency modulation of these retransmitted signals is controlled by means of the portion of the signals rectified at 33 by means of control means 34.

In order that the energy transmitted from antenna 37 does not interfere with that received at 30, that is, is not fed back to the amplifier over antenna 30 to build up singing oscillations, it is necessary to provide some arrangement whereby such feedback cannot occur. This may be accomplished by transmitting from antenna 37 a frequency different from that received at 30 and reconverting the energy after receipt on the craft back to the same frequency as that of the craft transmitter. Thus the frequency range of the retransmitted waves may be made to vary correspondingly with the aircraft transmitter but at a frequency range differing therefrom. Feedback may accordingly be prevented by tuning the circuit of receiver 31 to reject the band of frequencies in the range transmitted at 37.

It is clear that if instead of reconverting the repeated signal after reception on the aircraft, the aircraft oscillator may be provided with means to generate in a wave in the same frequency range as that received from the repeater for providing the comparison to determine the distance.

A further and simpler arrangement for preventing feedback action is disclosed in Fig. 4. According to this figure an arrangement is provided so that the energy received on antennae 41, 42 is supplied to an amplifier 43 over branch lines 44, 45. The output circuit of amplifier 43 is coupled to transmitting antenna 46. If the path between the antenna including the coupling lines 44, and 45, and point 47 is made of such length, that the distance from point 47 to antenna 46 is substantially the same electrically in both directions, except for a 180° phase shift, then energy received on receiving antennae 41, 42, from antenna 46 will neutralize at point 47, so that there can be no feed into amplifier 43 therefrom. The type of arrangement is explained more in detail in the U. S. Patent 2,134,278, issued October 25, 1938, in the name of Andrew Alford.

While the antenna arrangement of Fig. 4 may be utilized, together with a repeater system such as that shown in Fig. 3, it is also clear that if desired, the amplifier arrangement 43, instead of including the various control elements shown in Fig. 3, may be simply an amplifier which will assume operation upon receipt of signals and retransmit the same signal from antenna 46 as amplified waves.

It is often desirable that with any transmitting system, such as the retransmitting arrangement in accordance with this invention, a means may be provided for indicating the identity of the station. Such an arrangement is disclosed in Fig. 5. According to this system the transmitting antenna 46 is shown coupled to a switching arrangement 50 and a receiving amplifier 51, to the receiving antenna. In the position shown receiving amplifier 51 is connected through upper contacts of switch 50, directly to the transmitting amplifier 70 to provide a retransmitting system. Switch 50 is controlled by a cam 52 driven from a motor 53 through gears 54, 55 and 56. When cam 52 is rotated so that the lower portion thereof is opposite switch 50, the switch contacts in the lower position are closed. Preferably the lower cam portion is shorter than the raised portion so that the distance indicating transmission is effective for the major portion of the time. Motor 53 simultaneously drives by means of gear 55 a record disc 60, which may be made of transparent material and have on its periphery a signal indicating the identity of the station. Immediately behind disc 60 is provided a lamp 61 which shines through the disc onto photocell 62 connected to a voice frequency amplifier 63. The output of voice frequency amplifier 63 is modulated in 64 with high frequency oscillations generated in oscillator 65. In this position modulator 64 has its output connected through the lower contacts of switch 50 to the transmitting amplifier 70 and antenna 46, and so transmits intermittently distance indicating signals and signals indicating the identity of the station. Preferably the oscillator 65 operates at a frequency such that signals may be received on the regular receiving apparatus, or on the distance determining receiver. The identifying radio waves may be received on the airplane by a suitable auxiliary receiver tuned to the frequency of oscillator 65.

Since the retransmitting station may not be required to operate during a large portion of the time, it may be preferable to have the power amplifier of the transmitter disconnected at times that the signals are not desired. I accomplish this result according to one system, by providing a relay 66 controlled from the output of receiver amplifier 51 over rectifier 67 to close switch 68 connected to the high tension power supply 69 for the radio frequency power amplifier 70. When no signals are being received on the receiving antenna, relay 66 is deenergized and connections are opened at 68. Upon receipt of signals, however, the high tension supply 69 is connected to amplifier 67 over contact 68. It is clear that other contacts may be provided under control of relay 66 to energize motor 53 and the auxiliary apparatus 63, 64, 65 only during receipt of signals in receiver 51 to provide further saving in power.

In the arrangement described above it is evident that should more than one aircraft attempt to obtain distance indication simultaneously, no clear reading could be obtained by either since the frequencies received on each aircraft would be hopelessly jumbled and no steady meter reading could be obtained. However, such a condition is not likely to arise as usually distance determinations will be made only at comparatively long intervals. If upon attempt to obtain a distance reading the meter shows that another craft is also trying to get a reading, the navigator need only continue trials until a steady indication is obtained.

Should traffic conditions be heavy enough to require it, several repeater stations may be erected at a particular port each responsive to a different frequency range and the aircraft circuit may be provided with switching means so that the transmitter may operate selectively at different frequency ranges. If one repeater is then busy the pilot may try another by changing the frequency range of this transmitter.

In Fig. 6 is disclosed one form of station suitable for use on the movable craft in accordance with my invention. In this system a variable frequency transmitter 71 is provided connected to the transmitting antenna 72. A rotatable loop antenna 73 may be used for receiving the signals, loop 73 being coupled to receiver 74. The frequency variable signals received may then be transmitted from receiver 74 to indicator 75 and a small part of the energy from 71 may be transmitted to 75 to provide a distance indication by frequency comparison. Simultaneously loop 73 may be adjusted directively so as to produce a directive indication in indicator 76. By this arrangement both the distance and direction of the transmitting station may be determined, thus enabling an airplane to find its exact position with reference to the transmitting station. This may be desirable in some cases where a limited landing area is provided and crafts leave this area and must return thereto. For example, on an aircraft carrier it is vital that the planes be enabled to return to the carrier, but it is preferable that they be enabled to fly as far as possible so as to make full use of the gasoline carried. By use of a system in accordance with my invention, this may be accomplished since the pilot of the aircraft will at all times know the distance from the transmitting source and may therefore determine if sufficient gasoline remains so that he may stay out awhile longer. In addition to the direction finding feature the aircraft may then head directly for the transmitting station.

In Fig. 7 an aircraft equipment suitable for determining direction and distance, and in addition receiving signals identifying the relay station, is illustrated. In this arrangement parts similar to Fig. 6 are provided with the same reference characters. At the receiver, in addition to the rotatable loop 73, I have shown an auxiliary non-directional sensing antenna 78. Of course, if the direction indication is not desired any type of aerial may be used. In the output of receiver amplifier 74 I provide a detector 79. The output of this detector is connected to an indicating arrangement such as shown by head phone 80 for indicating the identity of the station. Also, in the output of detector 79 is branched the rectifier unit 81 which serves to furnish energy for the direction indicator 76.

It is sometimes desirable that an aircraft be able to fly from a given station a particular distance therefrom in a given direction so that by merely reading the instruments the pilot will know exactly where he is. Such a result can be accomplished by use of a distance finding system in accordance with my invention in conjunction with a direction finder of Figs. 6 and 7, and a gyro-compass. However, it is desirable to have as little apparatus on the craft as possible. This may be accomplished by using on the ground, equipment to produce direction guiding instead of using a direction finder on the craft.

In Fig. 8 an embodiment of my invention whereby the pilot may be enabled to ascertain his position from a given retransmitting station is illustrated. In this arrangement at the transmitting station 80, is provided a repeater station of the type above described, whereby the pilot of the craft 81 may ascertain his distance from the transmitting station. Also, at station 80 is provided a beacon transmitter of any known type which defines a given course line. The pilot then merely need follow the given course line until his indicator of distance $d$ reads the desired value. Then by use of a suitable altimeter, preferably a radio altimeter, it is possible to fly at any desired height $h$, with respect to the ground surface at the particular distance $d$. In order to obtain these indications it is necessary that the aircraft carry the ordinary beacon receiving arrangement and in addition the distance finding system described in the present application and an accurate altimeter to indicate his altitude with respect to the earth. Since the altimeter and beacon receiver are generally standard equipment only the distance finder represents added apparatus. With this arrangement it is possible for a pilot of a craft to ascertain his position without being able to sight the ground. While the height must be taken into consideration for precise calculation of the distance along the ground, in practice this generally is not necessary since the angle included between ground and the line $d$ is so small that this indicated distance is substantially equal to the ground distance.

With these systems it is often desirable that the radiations from the beacon be such that it is not detectable at the ground level. Accordingly, an arrangement as disclosed in Fig. 9 may be used rather than the beacon system producing the field pattern of Fig. 8. In accordance with this arrangement of Fig. 9 the transmitter station may transmit a beacon guiding system at an angle to the earth, so that substantially no radiation occurs along the earth's surface itself. If the beacon is designed so as to produce only a single guide line, for example, by utilizing four intersecting patterns instead of two to define the beacon range, then the craft 81 need not carry an altimeter but need merely follow this single line until the meter on the plane indicates that the proper distance has been reached. The antenna of the repeater station should also be of such construction that radiation therefrom is directed away from the earth. This may be accomplished by the use of properly designed radiators or by various reflector arrangements as known in the art. Since the radiation as exemplified by the conical patterns say 83, is not perceptible at the surface of the earth at the position P, it is not possible for those at this position to know that the beacon is pointed in their direction.

If the beacon pattern 83 is not sufficiently narrow or if a single guide line is not provided, craft 81 may carry an altimeter for use in connection with the distance finder and beacon for precisely determining its position.

While I have described a few embodiments of my invention in connection with the accompanying drawings, it should be clearly understood that these are made merely by way of illustration. It is clear that each of the various embodiments illustrated in the figures may be modified by transposing and combining various elements of the systems illustrated as desired. Furthermore, any known type of recording arrangement and reproducing arrangement may be used instead of the photoelectric control arrangement disclosed in connection with Fig. 5. Likewise, it should be understood that at the receiving station, Figs. 6 and 7, various known arrangements for preventing coupling between antennae such as 72 and 73 may be provided. These may constitute, for example, shield arrangements to prevent any coupling. Other known arrangements such as systems for feeding over a portion of the energy in opposite phase so as to overcome the effect of mutual coupling may be utilized.

While I have disclosed various embodiments of my invention in the specification as described above, it should be distinctly understood that various modifications and alterations thereof may be made by those skilled in the art without departing from the spirit of the invention. What I consider my invention and upon which I desire to secure protection is embodied in the accompanying claims.

What I claim is:

1. A distance determining system, comprising means for transmitting radio frequency waves of cyclically varying frequency from a first station, means at a second station comprising a repeater for receiving said radio frequency waves and transmitting therefrom under control of said received waves corresponding radio frequency waves cyclically varying in frequency, means at said first station for receiving the waves transmitted from said second station and other waves varying in frequency corresponding to the frequency variations of waves from said first named transmitting means, and means at said first station responsive to said received waves and said other waves for comparing the frequency of said received waves and said energy for determining the distance between said first and second stations.

2. A distance determining system according to claim 1, further comprising direction finder means at said first station to indicate direction toward said second station, whereby the position of said first station with respect to said second station may be determined.

3. A distance determining system according to claim 1, further comprising means for intermittently interrupting transmission of said frequency variable waves at said second station, and means for transmitting other signals therefrom during said period of interruption.

4. A distance determining system according to claim 1, further comprising energy supply means at said second station and means at said second station responsive to energy received from said first station for supplying energizing power to said radio transmitting means at said second station from said energy supply means.

5. A distance determining system according to claim 1, wherein said waves transmitted from said second station are of the same frequency range as the waves received thereat from said first station, further comprising circuit means for preventing waves transmitted from said second station from affecting the operation of the receiving means at said second station.

6. In an aircraft position determining system, a transmitting station, means at said station for defining a radio beacon guiding course, means for determining the distance of said craft from said transmitting station comprising a cyclically variable frequency transmitter carried by said aircraft, means at said transmitting station responsive to receipt of said variable frequency waves for retransmitting to said craft waves correspondingly variable in frequency, and means on said aircraft for receiving said retransmitted waves and comparing them with said transmitted waves to determine distance, and means on said aircraft responsive to received energy for indicating when said aircraft is following said beacon guide course.

7. A navigation system for aircraft comprising means for transmitting radio frequency waves of cyclically varying frequency from a first station, means at a second station comprising a repeater for receiving said radio frequency waves and transmitting therefrom under control of said received waves radio frequency waves correspondingly cyclically varying in frequency, means at said first station for receiving the waves transmitted from said second station and for receiving other waves within the range of frequencies over which said first-mentioned transmitted waves are varied and means at said first station for comparing the frequencies of said received waves with the instantaneous frequency of said first-mentioned transmitted waves.

8. A navigation system for aircraft comprising means for transmitting radio frequency waves of cyclically varying frequency from a first station, a second station comprising a repeater for receiving said transmitted waves and for retransmitting said waves, means at said first station for receiving the waves transmitted from said second station and for receiving other waves within the range of frequencies over which said first-mentioned transmitted waves are varied, and means at said first station for comparing the frequencies of said received waves with the instantaneous frequency of said first-mentioned transmitted waves.

9. A navigation system for aircraft comprising means for transmitting radio frequency waves of cyclically varying frequency from a first station, a second station comprising a repeater for receiving said transmitted waves and for retransmitting said waves, means at said first station for receiving the waves transmitted from said second station and for receiving other waves within the range of frequencies over which said first-mentioned transmitted waves are varied, said other waves including waves transmitted from said first station and reflected by objects external to said first station, and means at said first station for comparing the frequencies of said received waves with the instantaneous frequency of said first-mentioned transmitted waves.

WILLIAM H. CAPEN.